United States Patent
Vogel

[11] Patent Number: 5,941,277
[45] Date of Patent: Aug. 24, 1999

[54] HYDRAULIC CHANGE-OVER VALVE

[75] Inventor: Günther Vogel, Dreieich, Germany

[73] Assignee: ITT Manufacturing Enterprises Inc., Wilmington, Del.

[21] Appl. No.: 09/029,802
[22] PCT Filed: Aug. 13, 1996
[86] PCT No.: PCT/EP96/03572
  § 371 Date: May 18, 1998
  § 102(e) Date: May 18, 1998
[87] PCT Pub. No.: WO97/10132
  PCT Pub. Date: Mar. 20, 1997

[30] Foreign Application Priority Data

Sep. 15, 1995 [DE] Germany ............ 195 34 219

[51] Int. Cl.⁶ .................................................. G05D 16/02
[52] U.S. Cl. ................. 137/505.42; 137/505; 138/30; 303/87
[58] Field of Search ................ 137/505, 505.42; 138/30; 303/87

[56] References Cited

U.S. PATENT DOCUMENTS

| | | | |
|---|---|---|---|
| 3,812,678 | 5/1974 | Doerfler | 137/505 X |
| 4,321,949 | 3/1982 | Mercier | 138/30 |
| 5,161,864 | 11/1992 | Cardenas et al. | |
| 5,354,187 | 10/1994 | Holland et al. | |
| 5,460,439 | 10/1995 | Hellmann et al. | 303/87 X |

FOREIGN PATENT DOCUMENTS

| | | |
|---|---|---|
| 0606840 | 7/1994 | European Pat. Off. |
| 1168718 | 4/1964 | Germany |
| 4030952 | 4/1992 | Germany |
| 4236045 | 11/1993 | Germany |
| 4336464 | 4/1995 | Germany |
| 2012872 | 8/1979 | United Kingdom |
| 90/11212 | 1/1990 | WIPO |

Primary Examiner—Stephen M. Hepperle
Attorney, Agent, or Firm—Rader, Fishman & Grauer PLLC

[57] ABSTRACT

To effectively prevent a hydraulically operated change-over valve for a hydraulic brake system from fluttering, according to the present invention, an air cushion which attenuates pressure pulsations is incorporated in the inlet chamber of the valve. This air cushion is provided in a simple manner by a preassembled unit comprising a metal bowl, a diaphragm, and a metal annular disc which is calked at its periphery with the edge of the metal bowl so that the diaphragm is clamped in a sealed manner.

5 Claims, 1 Drawing Sheet

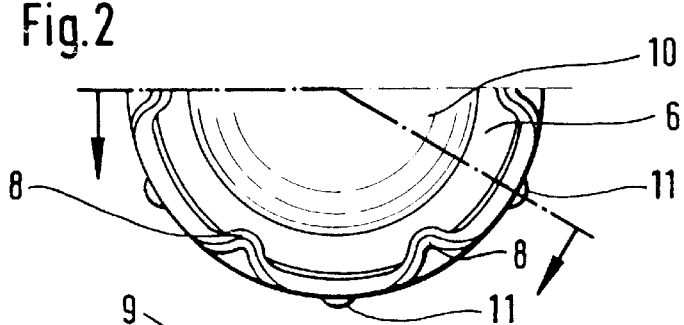
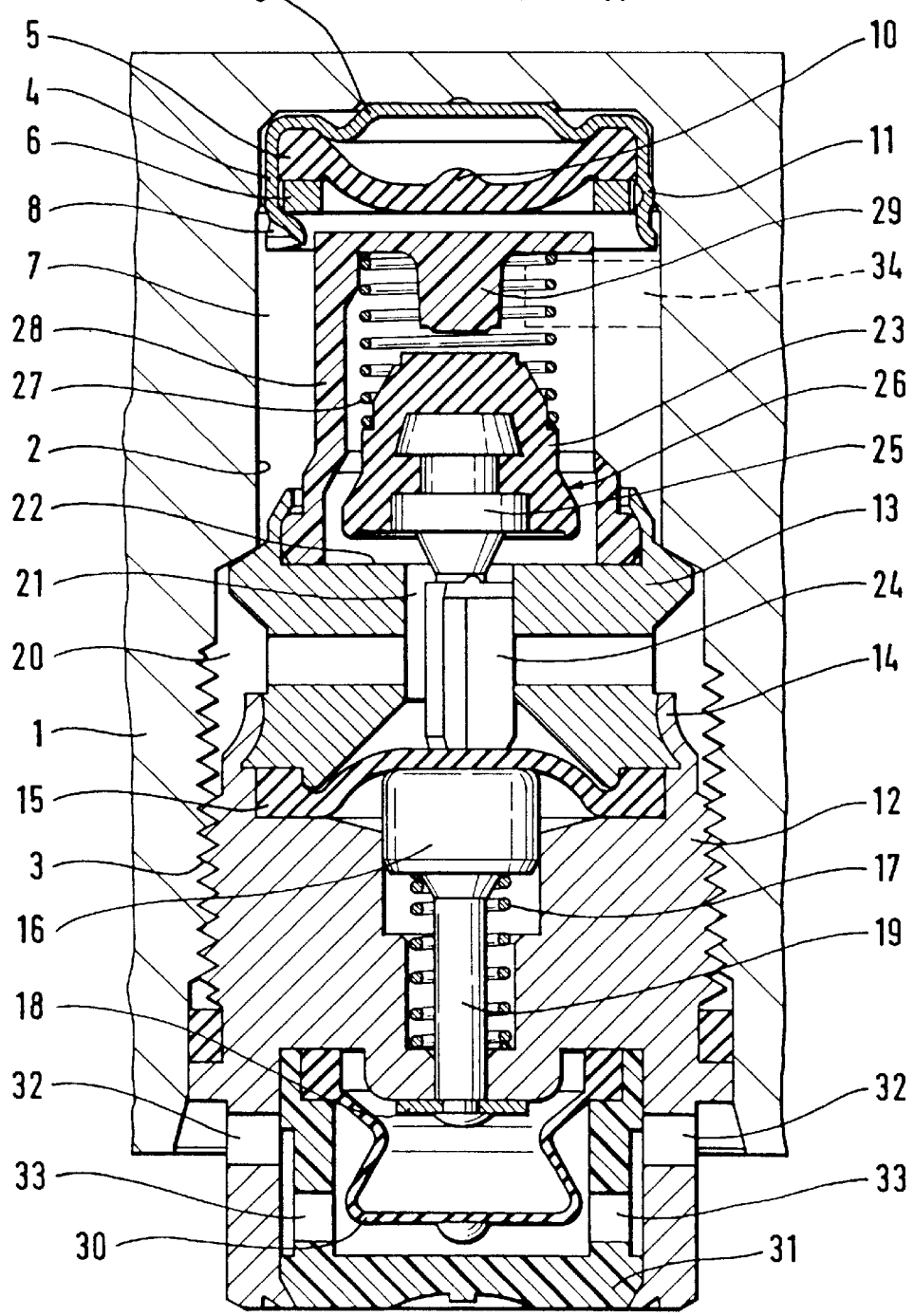

HYDRAULIC CHANGE-OVER VALVE

BACKGROUND OF THE INVENTION

The present invention is based on a hydraulically operated change-over valve of the type disclosed in German patent application No. 42 36 045, for example. The valve is intended for use in hydraulic brake systems with anti-lock control operating according to the return principle in anti-lock control operations, to which end they are provided with a return pump. To permit the propagation of pressure fluid into the wheel brakes for traction slip control without pedal-operated braking, the return pump is of the self-priming type and includes a suction line to the brake line. A separating valve is inserted into the brake line between the port of the suction line and the port of the pressure line of the return pump. To conduct the pressure fluid into the wheel brakes during pedal-operated braking, rather than simply to the suction side of the return pump, a hydraulically operated change-over valve which is controlled by way of the master cylinder pressure is inserted into the suction line. The master cylinder pressure is delivered into the inlet chamber of the valve and propagates through the valve seat into the outlet chamber. The suction side of the return pump is connected to the outlet chamber. The master cylinder pressure in the outlet chamber acts upon the first diaphragm causing it to move in the direction of the atmosphere. This enables the closure member, which along with its tappet is supported on the diaphragm, to move into abutment with the valve seat and close the change-over valve. From now on, the master cylinder pressure acts in the inlet chamber only. The outlet chamber remains connected to the suction side of the return pump only.

Without pedal operation, the change-over valve remains open because no pressure is applied from the outlet chamber to the diaphragm. In mere pedal-operated normal braking operations or in traction slip control operations, when the brake pedal is not applied, the hydraulically operated change-over valve operates reliably and with low noise. However, when the brake pedal is operated during traction slip control, for example, because the driver has recognized that the desired acceleration is impossible to achieve, or when the brake pedal is released after anti-lock control and the return pump is still running, the valve frequently starts to flutter and produces loud noises. This is due to the fact that the separating valve in the brake line is being opened or is open during pedal-operated braking operations so that the pressure pulses of the return pump propagate until the inlet chamber of the change-over valve as long as the master cylinder pressure is lower than the closing pressure to overcome the compression spring which acts upon the piston arranged on the atmosphere side. Subsequently, the pressure pulses of the return pump act so as to close the change-over valve, while in the outlet chamber the suction phases of the return pump act in the opening sense. Thereby, the valve is possibly pushed until it opens.

An object of the present invention is to provide a valve of the type referred to hereinabove involving low-noise operation in all phases of brake application.

SUMMARY OF THE INVENTION

This object is achieved by a change-over valve in which the inlet chamber is elastically attenuated by the provision of a second diaphragm in the inlet chamber which bounds only an enclosed air cushion. Pressure pulses of the return pump which enter the inlet chamber are effectively attenuated by the air cushion.

The larger the enclosed air volume is, the greater is the attenuating effect. Therefore, it is advisable that the second diaphragm is curved into the inlet chamber, thereby increasing the enclosed volume. The additional effect of the untensioned, curved shape of the diaphragm is that, when the material of the diaphragm swells up due to the pressure fluid used, the diaphragm is not urged into the air cushion but, on the contrary, deforms into the inlet chamber.

It is recommended to provide an enlargement in the middle of the diaphragm towards the enclosed air volume in order to minimize the abutment surface of the diaphragm on the rear wall of the air-filled chamber during pressure increase in the inlet chamber, thereby preventing sticking of the diaphragm.

A parallel preassembly of the air cushion is recommended in order not to extend the time of manufacture of one single valve in spite of the increased number of individual components used. This means that the chamber filled with air is provided by the second diaphragm and a metal bowl, and a metal annular disc is placed on the edge of the diaphragm and is clamped by the edge of the metal bowl. In this case, there is no need to mount the metal bowl into the inlet chamber of the change-over valve in a sealed fashion because the metal bowl itself forms the rear wall of the air-filled chamber.

The installation of the metal bowl is thus possible in a simple way by providing it with small bulges which easily keep it clamped in the inlet chamber.

The idea of the present invention will now be explained more closely by way of the description of a drawing including two Figures.

BRIEF DESCRIPTION OF THE DRAWING

In the drawing,

FIG. 1 is a change-over valve of the present invention.

FIG. 2 is a top view of a preassembled air cushion prior to its installation into a change-over valve of the present invention.

DETAILED DESCRIPTION OF THE DRAWING

The change-over valve of FIG. 1 includes a housing 1 in which a stepped bore 2 extends which has a thread 3 at its outlet. Two preassembled units are inserted into bore 2. One preassembled unit comprises a metal bowl 4, a diaphragm 5 and a metal annular disc 6 which together form a closed chamber filled with air. The air-filled chamber is an air cushion which is inserted into an inlet chamber 7 of the change-over valve at the end of bore 2. The diaphragm 5 with its enlarged periphery is clamped into the metal bowl 4 by way of the annular disc 6. Subsequently, the metal bowl 5 is provided along its periphery with several calked portions 8 so that the annular disc 6 is clamped by the edge of the metal bowl 4. In this arrangement, the diaphragm 5 with its thickened periphery acts so as to seal, with the result that the air volume enclosed between the diaphragm and a bottom 9 of the metal bowl is sealed. The diaphragm 5 lifts with its middle due to a curvature from bottom 9 of the metal bowl 4. Centrally, it includes an enlargement 10 which points to the bottom 9 of the metal bowl 4. The metal bowl 4 itself has several bulges 11, so-called warts. The purpose of the bulges is to clamp the bowl in its installation position shown at the end of the bore 2. The calked portions 8 are provided opposite the bulges 11, offset at the periphery, as can be seen in FIG. 2.

The second preassembled unit of the hydraulically operated change-over valve generally corresponds to FIG. 4 of the state of the art referred to hereinabove, i.e., to German patent application No. 42 36 045. A diaphragm 15 is clamped in between an externally threaded plug 12 and a valve member 13 with a valve seat by way of a circumferential calked portion 14. On the atmosphere side, diaphragm 15 is acted upon by a piston 16 which is exposed to the force of a compression spring 17 that is rearwardly supported on a step of the threaded plug 12. To protect the diaphragm 15 from excessive expansion, the stroke of piston 16 in the direction of the diaphragm 15 is limited by an annular disc 18 which engages a pin 19 connected to piston 16 outside the threaded member 12.

With its surface remote from the piston 16, the diaphragm 15 confines an outlet chamber 20 which is connected to the inlet chamber 7 by way of a valve passage 21. On the side of the inlet chamber, the valve passage 21 has a valve seat 22 which interacts with a closure member 23. Closure member 23 is connected to a tappet 24 which projects through the valve passage 21 and abuts the diaphragm 15. Closure member 23 has a metal head 25 onto which an elastic sealing element 26 is slipped. The elastic element 26 is acted upon by a compression spring 27 towards the valve seat 22, and the compression spring 27 has a weaker design than the compression spring 17 counteracting it and applying the piston 16.

The closure member 23 is encompassed by a filter 28 which is made of plastic material and is retained on the valve member 13 by a circumferential calked portion. In contrast to the state of the art, filter 28 has an additional stop 29 for the closure member 23 which prevents the closure member 23 from moving too far away from its valve seat 22. Stop 29 is generally cylindrical and formed integrally with the frame of filter 28. Stop 29 projects in an axial direction from the side of the air cushion into the area with the compression spring 27. A fabric (not shown) is inserted into the frame of the filter 28 in order to isolate particles from the valve passage 21 so that the sealing effect between the closure member 23 and the valve seat 22 is not impaired.

A further measure against contamination is taken with respect to the threaded plug 12. An elastic protective cap 30 is fitted at the point where the pin 19 projects from the threaded plug 12. Cap 30 is attached to the threaded plug 12 by a pot-shaped protective cover 31 staked with the threaded plug 12. With full pressure compensation given, the protective cap 30 provides absolute seal-tightness with respect to contaminants and fluids, and the protective cover 31 protects against mechanical damage. In order that atmospheric pressure prevails inside and outside the protective cap 30, both the threaded plug 12 and the protective cover 31 include radial apertures 32 or 33 which are offset in relation to one another.

The inlet chamber 7 has a pressure fluid inlet 34 (shown in dotted lines) which is connected to the brake line of a brake system between the master cylinder and the separating valve, so that a pressure fluid connection is established with the supply reservoir connected to the master cylinder when the brake pedal is not applied. The outlet chamber 20 has a pressure fluid port to the suction side of a self-priming return pump (the pressure fluid port is not shown).

During pedal-operated normal braking operations and during traction slip control operations, the operation of the valve shown corresponds to the state of the art and will not be explained herein. When pedal-operated braking is initiated during traction slip control, i.e. when the change-over valve is open, and the separating valve in the brake line is opened, the pressure peaks produced by the return pump can propagate into the inlet chamber 7. The same occurs when, upon release of the brake pedal after anti-lock control, the master cylinder pressure is not sufficient to close the change-over valve, while the return pump is still running. When the separating valve and the change-over valve are simultaneously open and the pump is still running, the effect is that the change-over valve is influenced in the opening direction during the suction phases of the return pump because the diaphragm 15 is lifted during aspiration by the pump. However, during the pressure phases of the return pump, the change-over valve is acted upon in the closing direction because the supply pressure of the pump acts through the open change-over valve upon the diaphragm 15 and urges it downwards.

Pressure pulsations of this type are greatly attenuated by the air volume enclosed between the diaphragm 15 and the metal bowl 4. This greatly reduces the effects of the pressure pulses of the pump on the diaphragm 15 which serves for the proper valve actuation.

The curved shape of the diaphragm 5 ensures a high degree of dimensional stability even when the material swells up because the diaphragm 5 deforms into the inlet chamber 7 when it is enlarged by swelling up. The preassembly of the air cushion permits a parallel fabrication of the air cushion and the proper valve unit. This shortens the cycle time during assembly.

Problems of contamination due to abraded particles will not be encountered because of the simple calking engagement. In spite of the large air volume enclosed, the prefabricated air cushion requires little mounting space, thereby obviating the need to increase the dimensions of the valve block which accommodates the change-over valve.

I claim:

1. A hydraulically operated change-over valve for a hydraulic automotive vehicle brake system, including an inlet chamber housing a closure member that is attached to a tappet which projects through a valve seat into an outlet chamber and abuts therein on a first diaphragm confining the outlet chamber remote from the inlet chamber, the diaphragm isolating the outlet chamber from an air-filled chamber which is connected to the atmosphere and from the direction of which the first diaphragm is acted upon by a piston that is loaded by a first compression spring towards the first diaphragm, wherein the inlet chamber is isolated from an enclosed air cushion by a second diaphragm.

2. A hydraulically operated change-over valve as claimed in claim 1, wherein the second diaphragm in its untensioned condition is curved towards the inlet chamber.

3. A change-over valve as claimed in claim 1, wherein the second diaphragm has an enlargement in its middle on the side of the air cushion which abuts a rearward boundary wall of the air cushion when high pressure prevails in the inlet chamber.

4. A change-over valve as claimed in claim 1, wherein the second diaphragm is inserted into a metal bowl, where it is retained on its periphery by a metal annular disc.

5. A change-over valve as claimed in claim 4, wherein the metal bowl on its outside wall includes a plurality of bulges which are urged against the outside wall of the inlet chamber.

* * * * *